US012619870B2

(12) United States Patent
Patwari et al.

(10) Patent No.: US 12,619,870 B2
(45) Date of Patent: May 5, 2026

(54) PROGRAMMABLE NON-LINEAR ACTIVATION ENGINE FOR NEURAL NETWORK ACCELERATION

(71) Applicant: Xilinx, Inc., San Jose, CA (US)

(72) Inventors: Rajeev Patwari, Campbell, CA (US); Chaithanya Dudha, San Jose, CA (US); Jorn Tuyls, Leinster (IE); Kaushik Barman, Hyderabad (IN); Aaron Ng, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1044 days.

(21) Appl. No.: 17/655,489

(22) Filed: Mar. 18, 2022

(65) Prior Publication Data

US 2023/0297824 A1 Sep. 21, 2023

(51) Int. Cl.
*G06N 3/08* (2023.01)

(52) U.S. Cl.
CPC ...................................... *G06N 3/08* (2013.01)

(58) Field of Classification Search
CPC ............ G06N 3/08; G06N 3/048; G06N 3/04; G06N 3/063; G06F 17/17; G06F 1/03; G06F 2207/4824
USPC .......................................................... 706/25
See application file for complete search history.

(56) References Cited

U.S. PATENT DOCUMENTS

| | | | | |
|---|---|---|---|---|
| 10,915,494 | B1 * | 2/2021 | Shalev | G06F 9/3001 |
| 11,494,622 | B2 * | 11/2022 | Li | G06N 3/047 |
| 11,562,217 | B2 * | 1/2023 | Sun | G06F 9/3004 |
| 2023/0078203 | A1 * | 3/2023 | Li | G06N 3/048 |
| | | | | 706/15 |

OTHER PUBLICATIONS

Ferrer et al.; NeuroFPGA-implementing artificial neural networks on programmable logic devices; 2004; IEEE (Year: 2004).*
Diganta Misra, Mish: A Self Regularized Non-Monotonic Activation Function, Misra: Mish Activation Function, arXiv:1908.08681v3 [cs.LG] Aug. 13, 2020, 14 pages.
Ashish Vaswani, et al., Attention Is All You Need, 31st Conference on Neural Information Processing Systems (NIPS 2017), Long Beach, CA, USA, arXiv:1706.03762v5 [cs.CL] Dec. 6, 2017, 15 pages.

* cited by examiner

*Primary Examiner* — David Yi
*Assistant Examiner* — Andrew Bracero
(74) *Attorney, Agent, or Firm* — Kevin T. Cuenot

(57) ABSTRACT

A programmable, non-linear (PNL) activation engine for a neural network is capable of receiving input data within a circuit. In response to receiving an instruction corresponding to the input data, the PNL activation engine is capable of selecting a first non-linear activation function from a plurality of non-linear activation functions by decoding the instruction. The PNL activation engine is capable of fetching a first set of coefficients corresponding to the first non-linear activation function from a memory. The PNL activation engine is capable of performing a polynomial approximation of the first non-linear activation function on the input data using the first set of coefficients. The PNL activation engine is capable of outputting a result from the polynomial approximation of the first non-linear activation function.

14 Claims, 13 Drawing Sheets

100

Instruction Decode
Table
108

| Instruction | Base Address (Pointer) |
|---|---|
| Sigmoid | Base Address 1 |
| Exp | Base Address 2 |
| Erf | Base Address 3 |
| tanh | Base Address 4 |
| mish | Base Address 5 |

Coefficients Table
110

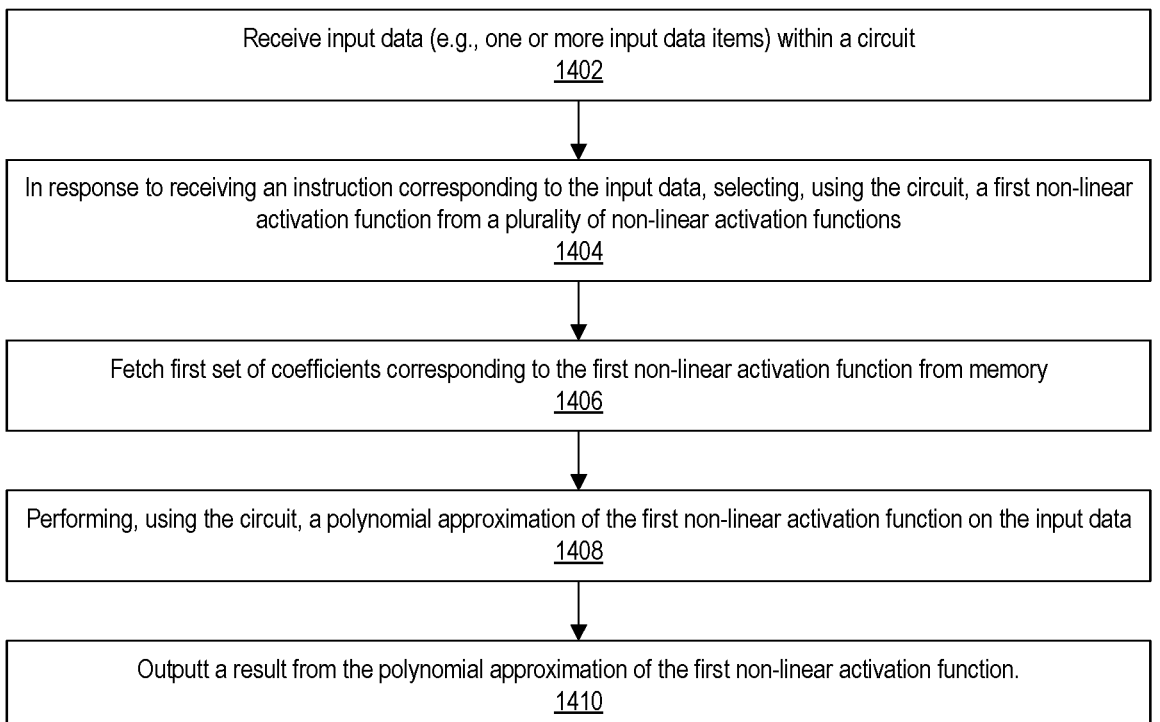

1400

Receive input data (e.g., one or more input data items) within a circuit
1402

In response to receiving an instruction corresponding to the input data, selecting, using the circuit, a first non-linear activation function from a plurality of non-linear activation functions
1404

Fetch first set of coefficients corresponding to the first non-linear activation function from memory
1406

Performing, using the circuit, a polynomial approximation of the first non-linear activation function on the input data
1408

Outputt a result from the polynomial approximation of the first non-linear activation function.
1410

FIG. 14

PROGRAMMABLE NON-LINEAR ACTIVATION ENGINE FOR NEURAL NETWORK ACCELERATION

TECHNICAL FIELD

This disclosure relates to integrated circuits (ICs) and, more particularly, to a programmable non-linear activation engine for neural network acceleration.

BACKGROUND

Deep learning refers to a subset of machine learning. To accomplish a given task, deep learning utilizes neural networks, also called "artificial neural networks" or "simulated neural networks." The structure of a neural network mimics the way that biological neurons of human brains communicate with one another. A neural network includes layers of interconnected nodes that are operable to categorize input data into categories of interest.

Natural Language. Processing (NLP) is an area of significant interest within deep learning. In general, NLP refers to a branch of computer science that endows computers with the ability to understand text and spoken words. NLP combines computational linguistics (e.g., rule-based modeling of human language) with statistical, machine learning, and deep learning models. Through NLP, a computer is able to determine meaning, intent, and/or sentiment from text or voice data.

Examples of neural networks adapted to perform NLP include Transformer and BERT. Similar to Convolutional Neural Networks (CNNs), NLP networks are often cascaded and include several linear and non-linear functions. In general, a "linear" layer computes multiplication or correlation of input data with model dependent parameters, and subsequently adds a "bias" to the output. A "non-linear" layer enables the network to learn complex, non-linear features pertaining to the specific layer thereby enabling complex feature detection in subsequent layers. The non-linear layers facilitate learning of parameters during training and higher accuracy in during inference.

SUMMARY

In one or more example implementations, a method includes receiving input data within a circuit. The method includes, in response to receiving an instruction corresponding to the input data, selecting, using the circuit, a first non-linear activation function from a plurality of non-linear activation functions by decoding the instruction. The method includes fetching a first set of coefficients corresponding to the first non-linear activation function from a memory. The method includes performing, using the circuit, a polynomial approximation of the first non-linear activation function on the input data using the first set of coefficients. The method includes outputting a result from the polynomial approximation of the first non-linear activation function.

In one or more example implementations, a system includes one or more processing circuits. The system includes a coefficients table stored in a memory. The coefficients table stores a set of coefficients for each non-linear activation function of a plurality of non-linear activation functions. The system includes an instruction decode table stored in the memory. The instruction decode table stores a pointer (e.g., a base address) to each of the plurality of non-linear activation functions in the coefficients table. The system includes a processing element configuration circuit configured to decode a received instruction to determine a non-linear activation function from the plurality of non-linear activation functions, fetch the set of coefficients for the determined non-linear activation function, and provide the set of coefficients fetched to the one or more processing circuits. The one or more processing circuits compute a result using a polynomial approximation of the determined non-linear activation function for one or more input data items using the set of coefficients fetched from the coefficients table.

In one or more example implementations, a system includes a processor configured to initiate operations. The operations include receiving input data. The operations include, in response to receiving an instruction corresponding to the input data, selecting a first non-linear activation function from a plurality of non-linear activation functions by decoding the instruction. The operations include fetching a first set of coefficients corresponding to the first non-linear activation function from a memory. The operations include performing a polynomial approximation of the first non-linear activation function on the input data using the first set of coefficients. The operations include outputting a result from the polynomial approximation of the first non-linear activation function.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 14 illustrates an example method of operation for a PNL activation engine as described within this disclosure.

DETAILED DESCRIPTION

Figures 1, 2:
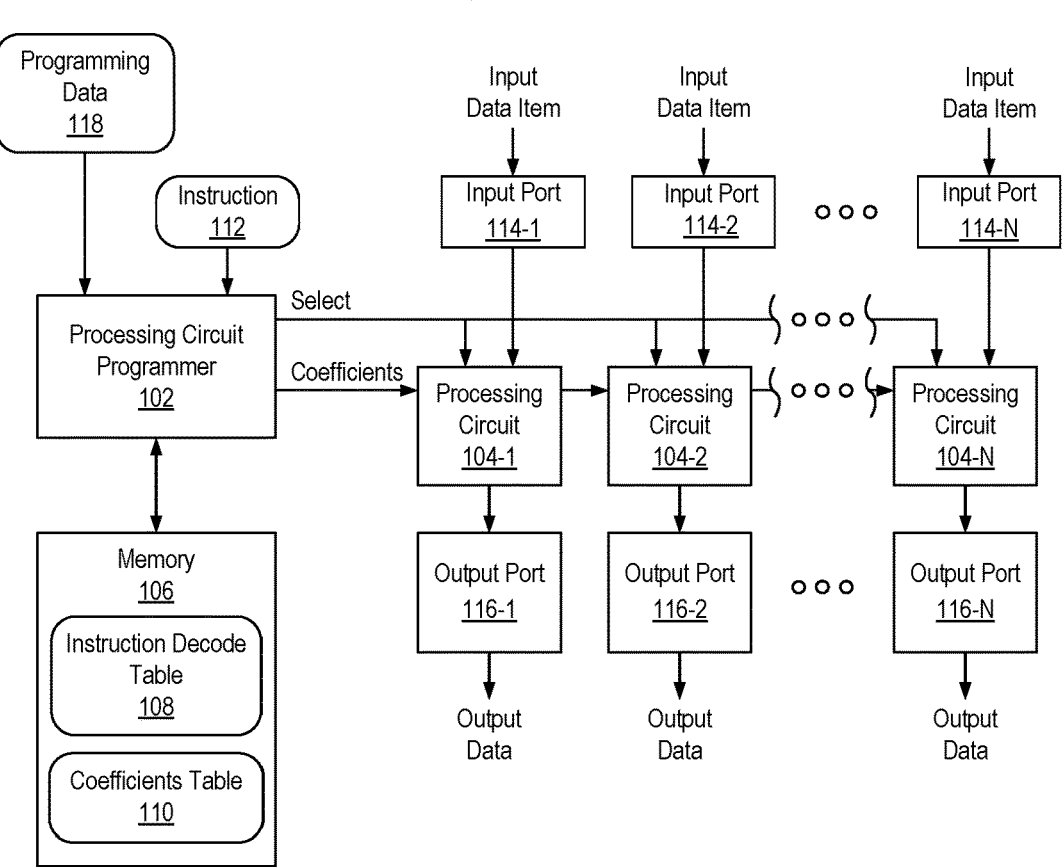
FIG. 1 illustrates an example architecture for a programmable non-linear (PNL) activation engine in accordance with the inventive arrangements described herein.
FIG. 2 is an example of an instruction decode table.

This disclosure relates to integrated circuits (ICs) and, more particularly, to a programmable non-linear (PNL) activation engine for neural network acceleration. In accordance with the inventive arrangements described within this disclosure, example circuit architectures for a PNL activation engine are disclosed. The example circuit architectures may be used in the context of neural networks to implement a plurality of different non-linear activation functions. That is, the example circuit architectures implement a PNL activation engine that may be used, at least in part, to implement the non-linear activation function(s) of one or more nodes of one or more layers of a neural network. In general, an activation function determines whether a node is activated. An activated node passes information along to a next layer of the neural network.

For purposes of illustration, consider the Transformer and BERT neural networks. Each uses an "attention" block. The attention block generally includes a linear matrix multiply (MatMul), followed by a non-linear GeLU/SoftMax/Erf functions depending on the particular architecture of the neural network. The attention block is intended to recognize temporal and/or spatial dependencies in input data which may be, for example, a sequence of words or symbols. Within the example neural network architectures mentioned, the attention block appears several times and is often cascaded. The particular non-linear function used in the attention blocks may be different than the non-linear function(s) used in the neural network outside of the attention block(s).

In one or more example implementations, the PNL engine(s) may be used with neural networks, including those such as Transformer and BERT in the context of natural language processing (NLP). It should be appreciated, however, that the example PNL engine(s) described herein may be used with other types of neural networks including, for example, Convolutional Neural Networks (CNNs).

In one or more example implementations, the particular non-linear activation function implemented by a PNL activation engine at any point in time may be changed dynamically during runtime. As such, the example PNL activation engines described within this disclosure are capable of computing results for any of a plurality of different non-linear activation functions without having to take the PNL activation engine, or device in which the PNL activation engine is disposed, offline for reconfiguration. That is, the example PNL activation engines may be programmed at and/or during runtime to determine any of a plurality of different non-linear activation functions. One benefit of the example PNL activation engines is that a single PNL activation engine may be used and/or re-used to calculate results for different non-linear activation functions. A single PNL activation engine can be used for different nodes and/or layers of the neural network that may use different activation functions (e.g., whether such non-linear activation functions are within an attention block or external to such a block).

In one or more example implementations, the example PNL activation engines may use an approximation technique to compute a result for any of the plurality of different non-linear activation functions. The approximation technique may be used with little loss in accuracy. Other benefits of the example PNL activation engines described herein include, but are not limited to, reduced time for developing a neural network and the ability to implement the neural network using a lesser amount of circuit resources of the device or IC used to implement the neural network.

In many practical applications of neural networks, the distribution of data, e.g., the ranges of values, at different stages or layers in the neural network may vary depending on the problem or application for which the neural network has been trained. In accordance with the inventive arrangements described herein, the approximations of the non-linear activation functions determined by the example PNL activation engine(s) may be tuned or adjusted according to the distribution or range of the data being processed. Further aspects of the inventive arrangements are described below with reference to the figures.

FIG. 1 illustrates an example architecture for a PNL activation engine 100 in accordance with the inventive arrangements described herein. In the example of FIG. 1, the PNL activation engine 100 includes a processing circuit programmer 102, one or more processing circuits 104, and a memory 106 configured to store an instruction decode table 108 and a coefficients table 110. PNL activation engine 100 may also include input ports 114 and output ports 116.

In one or more example implementations, PNL activation engine 100 may be implemented as circuitry. The PNL activation engine 100, for example, may be implemented as a hardened circuit block within an IC or implemented in programmable logic (e.g., using lookup-tables (LUTs), block-random access memories (BRAMs), and the like) within an IC.

In one or more other example implementations, the PNL activation engine 100 may be implemented as a processor and a memory. For example, the processor may be a vector processor. As an illustrative and non-limiting example, the PNL activation engine 100 may be implemented using a data processing (DP) tile or a DP tile and a memory tile within an IC. Examples of DP tiles and/or memory tiles are described hereinbelow in connection with FIGS. 6-9. In the case where the PNL activation engine 100 is implemented using a DP tile and/or a DP tile and a memory tile, the PNL activation engine may be implemented, at least in part, using a vector processor included in the DP tile. That is, the processing circuit programmer 102 and the processing circuits 104 may be realized by the vector processor executing instructions while memory 106 may be implemented as any of a variety of memories whether within the DP tile or implemented as the memory tile.

In conventional neural network implementations, the non-linear activation functions are offloaded to floating point processors such as central processing units (CPUs) and/or graphics processing units (GPUs). Such floating-point processors execute high precision mathematical libraries implemented in high-level programming languages such as C/C++ to determine highly accurate values for the non-linear activation functions. In the case of the ReLU and Leaky ReLU activation functions, the compute is generally implemented as a comparator. In other cases, CPUs may utilize a polynomial approximation of the non-linear activation functions.

Whether computing the result of the non-linear activation function or using a polynomial approximation thereof, CPUs lack the parallelism that is available on other devices. This limitation prevents neural networks such as Transformer and BERT from being accelerated more than the throughput provided by the particular processor (e.g., CPU or GPU) that is used. In addition, most CPUs utilize a 32-bit floating point (FP32) or 64-bit floating point (FP64) compute unit, which may be larger than what is required for the neural network being implemented (e.g., where the neural network may only require FP16).

In some conventional neural network implementations, each non-linear activation function may have a dedicated compute accelerator. This approach consumes a larger amount of IC resources (e.g., compute power and program memory). For example, conventional approaches of determining a polynomial approximation of a non-linear activation function in programmable logic have used fixed or static coefficients. Such approaches require that the programmable logic be reconfigured in the event that the non-linear activation function requires modification. Modification of the non-linear activation function may depend on a variety of factors.

For example, the data distribution (e.g., range) of values of input data items provided to each layer of the neural network may require that different coefficients be used. That is, though different stages of the same neural network may use the same non-linear activation function, such different stages may operate on data in different ranges. As such, the coefficients used for the polynomial approximation of that non-linear activation function may differ depending on the range of values of input data items being processed. In conventional implementations, changes to the coefficients, which have been fixed or static, require reconfiguration of the programmable logic. This consumes time that would otherwise be spent performing inference operations.

The example PNL activation engine 100 of FIG. 1 is programmable to determine polynomial approximations of a plurality of different non-linear activation functions without requiring that the device implementing the PNL activation engine 100 be reconfigured. The PNL activation engine 100 may operate on variable vectors and/or tensor sizes for different neural network architectures through the programming techniques described herein. In general, this means that the same PNL activation engine 100 is capable of computing results for a plurality of different non-linear activation functions including, but not limited to, Erf, exponential, Mish, Sigmoid, tanh, Softmax, GeLU, and Swish. In one or more examples, PNL activation engine 100 is capable of providing 16-bit floating point precision while using a programmable polynomial approximation technique.

In addition, the coefficients used for the polynomial approximations implemented by PNL activation engine 100 may be changed, e.g., programmed or reprogrammed, at runtime via a configuration port from a host computing system or a memory without having to load a new device image into the IC including PNL activation engine 100 for reconfiguration. The PNL activation engine 100 is capable of computing a result in parallel for a non-linear activation function using an arbitrary number of input data items (vector).

Referring to the example of FIG. 1, processing circuits 104 are capable of processing received input data via input ports 114. In one aspect, each input port 114 may be implemented as an interface circuit configured to receive an input data item and provide the input data item to the respective processing circuit 104. Input data received by PNL activation engine 100 that is of variable size may be transformed into blocks of vectors of size "N", where N is the total number of parallel processing circuits 104 illustrated in FIG. 1. In one aspect, input data items received via input ports 114 may be formatted as 16-bit floating point format (FP16) and include 1 sign bit, 7 exponent bits, and 8 mantissa bits. It should be appreciated, however, that data of different sizes and/or formatting may be received and operated on by PNL activation engine 100.

In the example, each processing circuit 104 is implemented as a compute block that is capable of performing a polynomial approximation of a selected non-linear activation function given a set of coefficients and an input data item received by a respective input port 114. Based on the select signal provided to each processing circuit 104 from processing circuit programmer 102, each processing circuit 104 is capable of performing a pre-scaling of the received input data items and/or a post-scaling of the computed polynomial approximation result. The pre-scaling and/or post-scaling are performed as multiplication operations. The output data, e.g., the final result, from each processing circuit 104 may be output from respective output ports 116. Each output port 116 may be implemented as an output interface configured to output a result generated by the respective processing circuit 104 to one or more other circuits and/or systems.

The instruction decode table 108 is capable of storing a list of instructions paired or associated with a base address (e.g., a pointer) to a location in coefficients table 110. In one aspect, each instruction of instruction decode table 108 corresponds to a particular or different non-linear activation function. Coefficients table 110 is capable of storing all coefficients for each polynomial approximation of each non-linear activation function that may be implemented by PNL activation engine 100. In one aspect, coefficients table 110 stores multiple sets of coefficients for each non-linear activation function, where each set of coefficients corresponds to a different range for the input values (e.g., input data items).

Depending on the implementation of PNL activation engine 100, memory 106 may be implemented as a single larger memory or as multiple, e.g., two, smaller memories. Memory 106 may be implemented in a DP tile, in a memory tile, as a combination of memories in a DP tile and a memory tile, in the programmable logic (e.g., as one or more LUTRAMs, BRAMs, and/or Ultra-RAMs or "URAMs"). Memory 106 may be initialized with default versions of instruction decode table 108 and coefficients table 110 during device initialization or boot by loading a programmable device image (PDI) or other configuration data into the device.

Processing circuit programmer 102 is capable of receiving instructions 112 and decoding the received instructions 112. For example, in response to receiving an instruction 112, processing circuit programmer 102 performs a lookup operation in instruction decode table 108 to determine a base address corresponding to the received instruction 112. The received instruction 112 corresponds to, or indicates, a particular non-linear activation function. Processing circuit programmer 102 performs a lookup operation in coefficients table 110 to determine, e.g., fetch, a set of coefficients to be used by processing circuits 104 in processing input data items. For example, using the base address obtained from instruction decode table 108, processing circuit programmer 102 retrieves or fetches a set of coefficients from coefficients table 110 and provides the set of coefficients to one or more of processing circuits 104 to process respective input data items.

As discussed, in one or more example implementations, coefficients table 110 may include multiple sets of coefficients for different ranges of values of input data items for each different non-linear activation function. In one aspect, instruction 112 specifies a particular range for values of the input data items that may be used to select a particular set of coefficients given the base address from instruction 112. That is, the particular set of coefficients to be used for a given non-linear activation function may be specified as an additional offset from the base address obtained from the coefficients table 110. Processing circuit programmer 102 is capable of performing a lookup into coefficients table 110 using the base address and additional offset.

The processing element programmer 102 receives programming data 118 via a programming data port and writes the programming data 118 to memory 106 (e.g., to one or both of instruction decode table 108 and/or coefficients table 110). In one aspect, during operation (e.g., at runtime), processing circuit programmer 102 receives an instruction 112 via an instruction port. Processing circuit programmer 102 decodes the instruction 112 to determine which coefficients to use based on the instruction table 108 and the coefficients table 110. Processing element programmer 102 is capable of broadcasting the coefficients over the coefficients port and broadcasting a select signal to processing circuits 104 initiating a compute operation in each processing circuit 104 on the respective received input data items using the broadcast coefficients.

In another aspect, during runtime, each input port 114 may be coupled to memory 106 to locally (e.g., within the respective input port 114) determine which coefficients to use. In this case, instead of broadcasting same coefficients to all input ranges, each input port 114 selects the particular set of coefficients to use based on a determination of the particular range in which the value of the received input data item falls. This allows a per input port 114/processing circuit 104 determination of the range of the value of the input data item and per input port 114/processing circuit 104 and range-based selection of the particular coefficients to be used. In another example implementation, memory 106 and the contents thereof may be distributed. That is, each processing circuit 104 may include a local memory 106 having a local instruction decode table 108 and local coefficients table 110 stored therein for purposes of range determination and coefficient selection.

Having determined the set of coefficients to be used in calculating the polynomial approximation for input data items, processing circuit programmer 102 is capable of configuring each processing circuit 104 by providing the set of coefficients to such processing circuit 104. As discussed, in one aspect, processing circuit programmer 102 is capable of providing each processing circuit 104 with the same set of coefficients. In another aspect, processing circuit programmer 102 is capable of providing each processing circuit 104 with its own set of coefficients. In the latter case, each processing circuit 104 may receive the same or different sets of coefficients depending on the range of the input data item received by the respective processing circuit 104. That is, processing circuit 104-1 may receive an input data item via input port 114-1, where the input data item is within a first range. As such, processing circuit 104-1 is provided with a first set of coefficients. Concurrently, processing circuit 104-2 may receive a different input data item via input port 114-2, where the different data item is within a second and different range. Accordingly, processing circuit 104-2 is provided with a second set of coefficients that is different from the first set of coefficients. This may be the case despite both processing circuits 104-1 and 104-2 performing a polynomial approximation of a same non-linear activation function.

In the example of FIG. 1, pre-scaling and post-scaling may be performed by the respective processing circuits 104 for a given input data item based on the state of the particular select signal provided to each respective processing circuit 104. In the example of FIG. 1, the Softmax activation function may be implemented through inclusion of an additional circuit, e.g., a digital signal processing circuit or compute tile as described herein, in PNL activation engine 100 or coupled thereto that is capable of operating on output data from output ports 116. The PNL activation engine 100, for example, may implement the "Exp" activation function with the additional circuit being configured to perform the additional processing described in Table 1 below.

In the example of FIG. 1, by storing a coefficients table 110, the need to provide coefficients to PNL activation engine 100 during operation is eliminated. This reduces the bandwidth required to operate the PNL activation engine 100 as multiple coefficients need not be transferred to the PNL activation engine 100 to process different input data items.

Each of the instruction decode table 108 and the coefficients table 110 may be edited or modified once implemented, e.g., at runtime of PNL activation engine 100. That is, the list of activation functions (e.g., instructions) and corresponding base addresses in instruction decode table 108 may be updated during runtime of PNL activation engine 100. Similarly, the sets of coefficients and/or ranges of coefficients table 110 may be updated during runtime of PNL activation engine 100. The instruction decode table 108 and the coefficients table 110 may be updated during runtime without having to reimage and/or reconfigure the device.

In one aspect, processing circuit programmer 102 includes a programming port through which programming data 118 may be received. Programming data 118 may be received to update instruction decode table 108 and/or coefficients table 110 as described. In one aspect, the programming port may be implemented as a physical hardware port that is compliant with any of a variety of known on-chip interconnect communication protocols. For example, the programming port may be implemented in compliance with the Advanced Microcontroller Bus Architecture (AMBA) eXtensible Interface (AXI) (hereafter "AXI") protocol and communication bus specifications. The programming port may be implemented as, for example, a memory mapped port or a stream port. In either case, the programming port provides runtime software masters (e.g., a host computer or other processor) access to update memory 106 and any data stored therein.

In another aspect, programming data 118 may be provided from a state machine that accesses a user defined memory space at runtime. The user defined memory space may be a RAM (on IC or off IC), a LUTRAM, a BRAM, and/or a URAM. The state machine may update memory 106 using the dedicated programming port.

FIG. 2 is an example of the instruction decode table 108 of FIG. 1. In the example of FIG. 2, the instruction decode table 108 includes a non-exhaustive list of non-linear activation functions as the instructions. Each instruction specifying a non-linear activation function is associated with a specific base address that may be used to index into the coefficients table 110.

Figure 3:
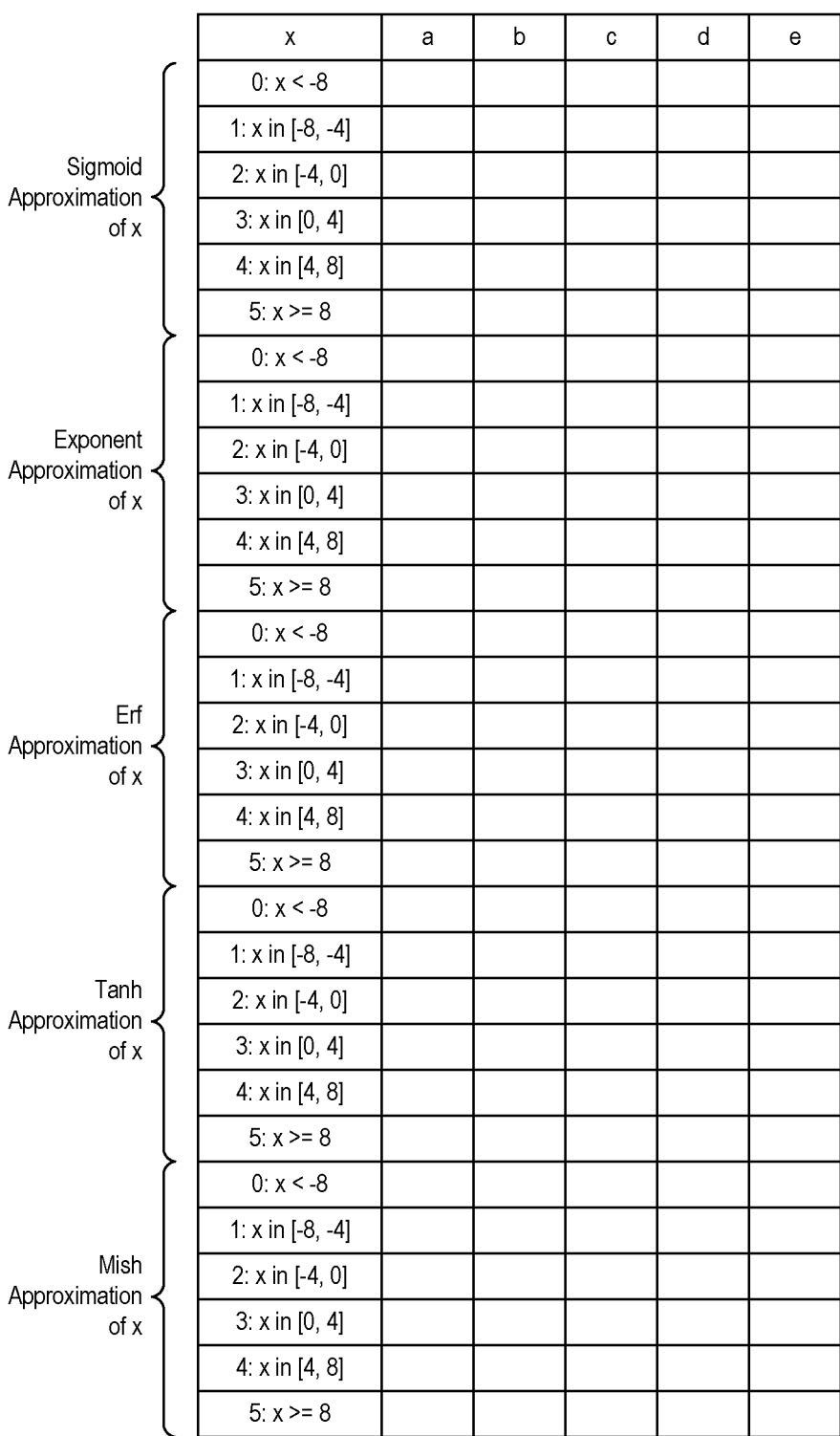
FIG. 3 is an example of a coefficients table.

FIG. 3 is an example of the coefficients table 110 of FIG. 1. In the example of FIG. 3, for each of the non-linear activation functions that can be approximated by the PNL activation engine 100, the coefficients table 110 a list of ranges for values of input data items "x". The example of FIG. 3 is not intended to be exhaustive of the types of non-linear activation functions that may be used with the PNL activation engine 100. For each range, values for the coefficients a, b, c, d, and e may be specified. While FIG. 3 does not illustrate particular values for each set of coefficients, it should be appreciated that each set of coefficients may vary from one non-linear activation function to another and, for a given non-linear activation function, from one range to another. Further, the degree of the polynomial approximation and, as such, the number of coefficients included in the coefficients table 110 may vary depending on the implementation of PNL activation engine 100.

Table 1 illustrates example non-linear activation functions and corresponding polynomial approximations that may be performed by the PNL activation engine 100. Table 1 also illustrates whether pre-scaling of the input data item or post-scaling of the polynomial approximation as computed is required for each respective non-linear activation function.

In the example shown in Table 1, the Erf, Exponential, Mish, Sigmoid, and Tanh non-linear activation functions may be approximated without requiring pre- or post-scaling. The Softmax, GeLU, and Swish non-linear activation functions may be approximated using scaling as shown.

Figure 4:
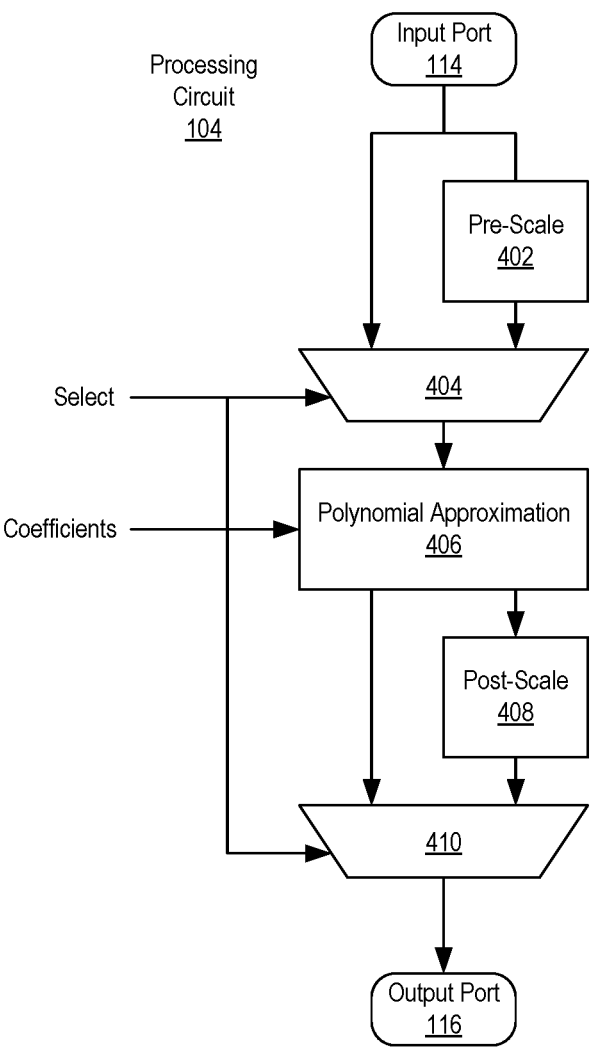
FIG. 4 illustrates an example circuit architecture that may be used to implement a processing circuit of the PNL activation engine of FIG. 1.

FIG. 4 illustrates an example circuit architecture that may be used to implement a processing circuit 104. In the example, the processing circuit 104 includes a pre-scale circuit block 402, a switch (e.g., multiplexer) 404, a polynomial approximation circuit 406, a post-scale circuit block 408, and a switch (e.g., multiplexer) 410. In the example, the select signal is used to specify whether switch 404 passes the data item received by input port 114 as is or the pre-scaled input calculated by pre-scale circuit block 402 on to polynomial approximation circuit 406. Pre-scale circuit block 402 may be programmed to multiply by a particular value. Polynomial approximation circuit 406 calculates the polynomial approximation for the non-linear activation function using the coefficients provided from processing circuit programmer 102. The select signal is also used to specify whether switch 410 passes the result generated by the polynomial approximation circuit 406 or the post-scaled result calculated by post-scale circuit block 408 to output port 116. Post-scale circuit block 408 may be programmed to multiply by a particular value.

As discussed, the processing circuits 104 may be implemented as hardened circuit blocks or implemented using programmable logic using the example architecture described in the example of FIG. 4. In one or more other example implementations, the processing circuit 104 may be

TABLE 1

| Non-Linear Activation Function | Mathematical Formula | Approximation method (degree = 4) |
|---|---|---|
| Erf(x) | $\mathrm{erf}(x) = \dfrac{2}{\sqrt{\pi}} \displaystyle\int_0^x e^{-t^2}\, dt$ | Polynomial approximation: erf_approx(x) = a + b*x + c*(x$^2$) + d*(x$^3$) + e*(x$^4$) |
| Exponential(x) | f(x) = e$^x$ | Polynomial approximation: exp_approx(x) = a + b*x + c*(x$^2$) + d*(x$^3$) + e*(x$^4$) |
| Mish(x) | f(x) = xtanh(softplus(x)) | Polynomial approximation: Mish_approx(x) = a + b*x + c*(x$^2$) + d*(x$^3$) + e*(x$^4$) |
| Sigmoid(x) | $S(x) = \dfrac{1}{1 + e^{-x}}$ $= \dfrac{e^x}{e^x + 1}$ | Polynomial approximation: sigmoid_approx(x) = a + b*x + c*(x$^2$) + d*(x$^3$) + e*(x$^4$) |
| Tanh(x) | $\tanh(x) = \dfrac{\sinh(x)}{\cosh(x)}$ $= \dfrac{e^x - e^{-x}}{e^x + e^{-x}}$ $= \dfrac{e^{2x} - 1}{e^{2x} + 1}$ | Polynomial approximation: tanh_approx(x) = a + b*x + c*(x$^2$) + d*(x$^3$) + e*(x$^4$) |
| Softmax(x) | $\sigma(x)_i = \dfrac{e^{x_i}}{\displaystyle\sum_{j=1}^{K} e^{x_j}}$ | Using exponential polynomial approximation exp_approx(x) can be calculated for each value and consequently the Softmax |
| GeLU(x) | xσ(1.702x) | Using sigmoid polynomial approximation gelu_approx(x) = x*(sigmoid_approx(1.702*x)) |
| Swish(x) | swish(x) := x × sigmoid (βx) | Using sigmoid polynomial approximation, swish_approx(x) = x*(sigmoid_approx(beta*x)) | implemented as a vector processor that is programmed to perform the operations described herein and in connection with FIG. 4.

Figure 5:
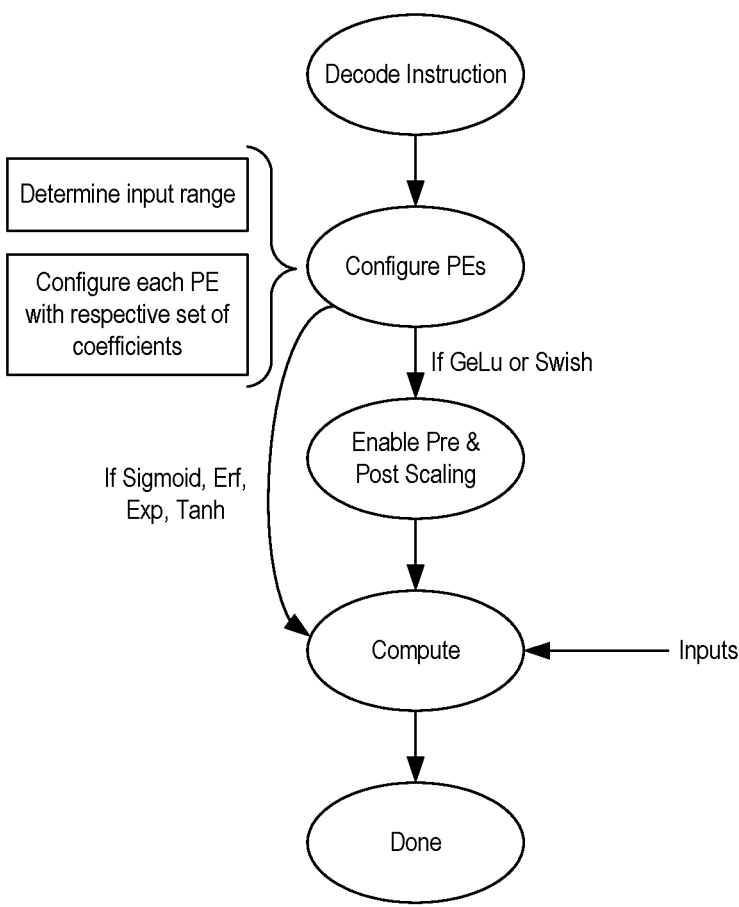
FIG. 5 illustrates an example of a state machine that may be implemented by the processing circuit programmer of the PNL activation engine of FIG. 1.

FIG. 5 illustrates an example of a state machine that may be implemented by the processing circuit programmer 102. As shown, processing circuit programmer 102 is capable of decoding a received instruction and configuring the processing circuits 104. Configuring the processing circuits 104 may include determining the input range of the input data items (e.g., for one or more or each processing circuit 104) and configuring each processing circuit 104 with a respective set of coefficients.

If the non-linear activation function specified by the received instruction that is decoded is one that does not require pre or post scaling (e.g., Sigmoid, Erf, Exponential, Tahn), then the processing circuit 104 performs compute on the received input data using the provided set of coefficients to generate output data. If the non-linear activation function specified by the received instruction that is decoded is one that does require pre- and/or post-scaling, the processing circuit programmer 102 enables pre- and/or post-scaling as the case may be prior to continuing to the compute state where processing circuit 104 calculates the polynomial approximation using the provided set of coefficients. Pre- and/or post-scaling is applied as applicable based on the non-linear activation function specified by the decoded instruction.

In one or more example implementations, a controller or other processor may be used in coordination with the PNL activation engine 100 to sort or organize the order in which input data items are provided to the processing circuits 104. By organizing inputs in groups so that inputs in the same range are provided consecutively to each respective processing circuit 104, higher throughput may be achieved in that fewer lookups of sets of coefficients need be performed.

In accordance with the inventive arrangements described herein, one or more PNL activation engines 100 are capable of operating in different modes. The first mode (e.g., mode 1) is a low utilization mode. In mode 1, the range of each input data item "x" is detected. For example, if the input data to PNL activation engine 100 includes "N" input data items, a range is determined for each of the N input data items. The particular processing circuit 104 tasked with processing a given input data item is provided with a set of coefficients specific to the range in which the value of the input data item provided to that processing circuit 104 falls. In mode 1, the set of coefficients provided to each respective processing circuit 104 may vary and depends on the range of the input data item received by each respective processing circuit 104.

Mode 1 typically incurs higher latency to evaluate the value of each input data item to determine range and multiple lookup operations. In the case of mode 1, since at any given time a look-up for one input data item is performed, resources of PNL activation engine 100 are re-used for subsequent inputs. Given 10 input data items on input port 114-1, for example, output data is calculated for each of the input data items sequentially (e.g., one at a time). Using this approach, only 1 equation is solved at a time as opposed to a vector processor operating on all 10 input data items. In examples where such a sequential technique is implemented, the amount of time needed to process the 10 input data items is increased, while the amount of circuit resources of the IC is reduced compared to a parallel implementation.

Mode 1 may be used in cases where the PNL activation engine 100 is to be implemented to consume less area and/or lower power where longer latencies may be tolerated. This allows the number of processing circuits 104 to be main-tained as fixed or reduced. That is, serializing the processing of input data items on a fixed set of resources (e.g., fixed or reduced number of processing circuits 104) reduces resource utilization and/or power consumption without reducing accuracy.

The second mode (e.g., mode 2) is a low latency mode. In mode 2, each processing circuit 104 computes the output of "x" for each set of coefficients for the selected non-linear activation function. Thus, each processing circuit 104 calculates an output value for a given input data item for each of the available ranges. Each processing circuit 104 is programmed with the same sets of coefficients—e.g., the set of coefficients for each range of the selected non-linear activation function. Concurrently with the processing described, each processing circuit 104 is capable of calculating the range of the value of the received data input item. Each processing circuit 104 may then select the result that was calculated using the set of coefficients corresponding to the determined range of the value of the input data item. Mode 2 has slightly lower latency than mode 1 in that each processing circuit 104 may be preloaded with all sets of coefficients for a given non-linear activation function, incurs higher utilization of resources, and requires a higher level of computational power.

A third mode (e.g., mode 3) is a low latency mode and a low utilization mode. Mode 3 utilizes additional information in the received instruction 112. In mode 3, the instruction 112 specifies a range of each of the data input items (e.g., a range of each "x" received by a processing circuit 104). In this example, each processing circuit 104 is provided with the particular set of coefficients for the range of the value of the input data item received by the respective processing circuit 104. To utilize mode 3, the input ranges of the values of the input data items must be known a priori. Determining the range for the input data items may be achieved using calibration-based quantization techniques or other similar approaches.

A fourth mode (e.g., mode 4) is a reduced accuracy, low latency, and low utilization mode. Mode 4 uses a single range for input data items for the coefficients. That is, each processing circuit 104 processes the received input data item using the same set of coefficients regardless of whether the values of the input data items of the different processing circuits 104 are in different ranges. In scenarios where a small amount of degradation in accuracy is tolerable, e.g., with a priori knowledge that some activations can be clipped, mode 4 may be used. In using mode 4, some activations may lie outside the supported range of polynomial approximation and thus incur loss of accuracy. If the loss of accuracy is tolerable and within limits, mode 4 can be used to significantly reduce the amount of resources used and reduce the latency. In using mode 4, the processing circuit programmer 102 is largely removed from operation of each processing circuit 104 since each processing circuit 104 need only be loaded initially with the set of coefficients to use (e.g., an not reloaded with different sets of coefficients for different ranges of values of input data items).

Accordingly, in cases where the values of the input data items of the different processing circuits 104 lie in different ranges, modes 1, 2, and/or 3 may be implemented. In cases where the values of the input data items for different processing circuits 104 lie in the same range or do not but a small loss of accuracy is tolerable, mode 4 may be used.

For purposes of illustration, consider Example 1 showing example ranges that may be stored in the coefficients table 110 for a selected non-linear activation function.

Example 1

0: −8 to −4
1: −4 to 0
2: 0 to 4
3: 4 to 8

Using the example ranges of Example 1, were an input data item with a value of −3.2 to be received, the range index would be determined to be 1 such that the set of coefficients associated with range index 1 and the range −4 to 0 would be used for the polynomial approximation performed by the particular processing circuit 104 that received the value of −3.2. Given input data items with values of −3.2, 3, 5, and −7, the respective range indexes (and corresponding sets of coefficients) used to process the respective input data items would be 1, 2, 3, and 0, respectively.

As discussed, ranges may be specified by the received instructions. In other example implementations, ranges may be determined using comparators. Example 2 illustrates an example implementation of comparators that may be realized in program code as executed by a processor (e.g., a vector processor) and/or synthesized into circuitry for implementing comparators to determine the particular range of a value of a given input data item.

Example 2

```
If (x<−8): CLIP
Else if ((x>=−8) and (x<−4)): range_index=0
Else if ((x>=−4) and (x<0)):          range_index=1
Else if ((x>=0) and (x<4)):           range_index=2
Else if ((x>=4) and (x<8)):           range_index=3
Else if (x>=8): CLIP
```

In the Example 2, a "CLIP" signal or error message may be generated in cases where the received input data item "x" is less than −8 or greater than 8 (e.g., is out of range).

Figure 6:
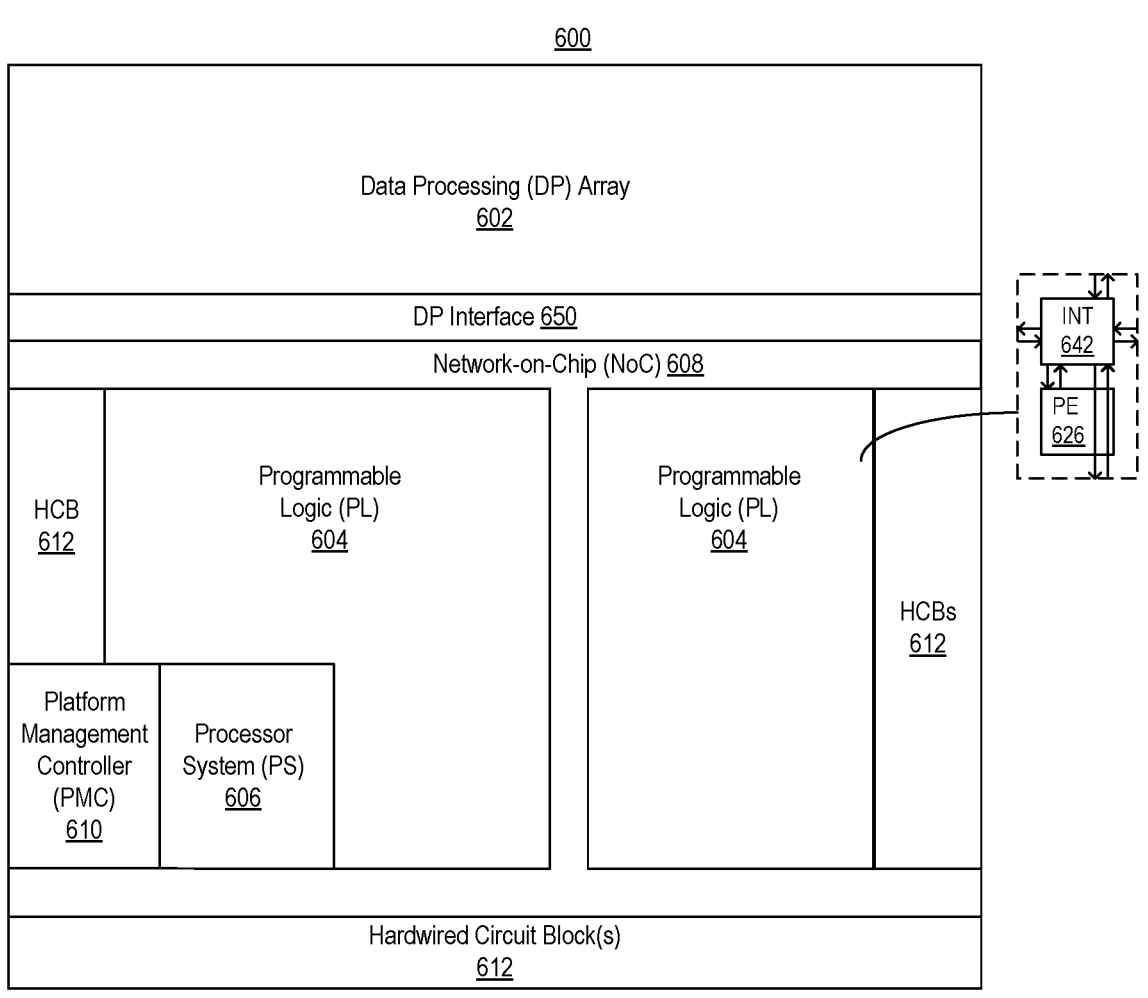
FIG. 6 illustrates an example architecture for an integrated circuit.

FIG. 6 illustrates an example architecture 600 for an IC. Architecture 600 may be used to implement a programmable IC, an adaptive system, and/or a System-on-Chip (SoC). In the example of FIG. 6, architecture 600 is implemented on a single die provided within a single package. In other examples, architecture 600 may be implemented using a plurality of interconnected dies within a single package where the various resources of architecture 600 (e.g., circuits) illustrated in FIG. 6 are implemented across the different interconnected dies.

In the example, architecture 600 includes a plurality of different subsystems including a data processing (DP) array 602, programmable logic (PL) 604, a processor system (PS) 606, a Network-on-Chip (NoC) 608, a platform management controller (PMC) 610, and one or more hardwired circuit blocks 612.

DP array 602 is implemented as a plurality of interconnected and programmable compute tiles and/or memory tiles. Compute and/or memory tiles may be arranged in an array and are hardwired. Each compute tile can include one or more cores and a RAM. Each memory tile may include a RAM. In one example implementation, cores of the compute tiles may be implemented as custom circuits that do not execute program code. In another example implementation, cores of the compute tiles are capable of executing program code stored in core-specific program memories contained within each respective core.

As an example, a core of a compute tile may be implemented as a vector processor capable of performing both fixed and floating-point operations and/or a scalar processor. Each compute tile further includes a RAM and dedicated multi-bit data movement channels connecting the compute tiles. Each compute tile further can include support for direct memory access (DMA) operations and locks to move data to and from other compute tiles.

DP array 602 may include a DP interface 650 that connects compute tiles or memory tiles to other resources of architecture 600. DP interface 650 may include a plurality of interconnected interface tiles organized in a row. In one example, each interface tile may have a same architecture. In another example, interface tiles may be implemented with different architectures where each different interface tile architecture supports communication with different types of resources of architecture 600. Interface tiles of DP interface 650 are connected so that data may be propagated from one interface tile to another bi-directionally. Each interface tile is capable of operating as an interface for the column of compute tiles and/or memory tiles directly above.

PL 604 is circuitry that may be programmed to perform specified functions. As an example, PL 604 may be implemented as field programmable gate array type of circuitry. PL 604 can include an array of programmable circuit blocks. As defined herein, the term "programmable logic" means circuitry used to build reconfigurable digital circuits. Programmable logic is formed of many programmable circuit blocks that provide basic functionality. The topology of PL 604 is highly configurable unlike hardwired circuitry. In one aspect, each programmable circuit block of PL 604 includes a programmable element 626 (e.g., a functional element) and a programmable interconnect 642. The programmable interconnects 642 provide the highly configurable topology of PL 604. The programmable interconnects 642 may be configured on a per wire basis to provide connectivity among the programmable elements 626 of programmable circuit blocks of PL 604 and is configurable on a per-bit basis (e.g., where each wire conveys a single bit of information) unlike connectivity among the compute tiles and/or memory tiles in data processing array 602, for example.

Examples of programmable circuit blocks of PL 604 include configurable logic blocks having look-up tables (LUTs) and registers. Unlike hardwired circuitry described below and sometimes referred to as hardwired circuit blocks, these programmable circuit blocks have an undefined function at the time of manufacture. PL 604 may include other types of programmable circuit blocks that also provide basic and defined functionality with more limited programmability. Examples of these circuit blocks may include digital signal processing blocks (DSPs), phase lock loops (PLLs), BRAMs, URAMs, and the like. These types of programmable circuit blocks, like others in PL 604, are numerous and intermingled with the other programmable circuit blocks of PL 604. These circuit blocks may also have an architecture that generally includes a programmable interconnect 642 and a programmable element 626 and, as such, are part of the highly configurable topology of PL 604.

Prior to use, PL 604, e.g., the programmable interconnect and the programmable elements, must be programmed or "configured" by loading data referred to as a configuration bitstream into internal configuration memory cells therein. The configuration memory cells, once loaded with a configuration bitstream, define how PL 604 is configured, e.g., the topology, and operates (e.g., particular functions performed).

In one or more example implementations, PL 604 may be configured to implement one or more PNL activation engines 100. Once implemented by loading configuration data, the PNL activation engines 100 may be reprogrammed as described herein without loading new and/or modified configuration data (e.g., as may be included in a PDI).

For purposes of illustration, the architecture 600 of FIG. 6 may implement polynomial approximation as described herein using approximately 5 DSP blocks and cascading the DSP blocks. An operating frequency of approximately 500 Mhz may be achieved.

For example, the DSP blocks may be cascaded so that a first DSP block calculates the value of $x^2$, a second DSP block calculates $x^2*c$, a third DSP block may calculate $x^3$, etc. A post adder may be added for accumulation. Pre-scaling and/or post-scaling may be implemented using another DSP block that is capable of either changing the value provided as input to the cascaded chain of DSP blocks or the value that is output from the polynomial approximation.

In one or more other example implementations, DP array 602 may be configured with an application that implements one or more PNL activation engines 100 therein. In a DP array 602 implementation, a compute tile may perform the operations described herein as implemented in program code.

In certain example implementations, quantizer and/or dequantizer layers of a neural network may be implemented using the PL 604 or the DP array 602. Implementing such layers in hardware eliminates the need to implement such layers in software (e.g., using PS 606 and/or a host processor located off-chip). In general, a quantizer layer is capable of converting an integer value to a floating-point value (with or without scaling and zero-point correction). A dequantizer layer is capable of converting a floating-point value to an integer value (with or without scaling and zero-point correction).

Whether the PNL activation engine 100 is implemented using a compute tile or in PL 604, it should be appreciated that multiple instances of PNL activation engine 100 may be implemented in an IC using architecture 600 or architectures similar thereto.

PS 606 is implemented as hardwired circuitry that is fabricated as part of architecture 600. PS 606 may be implemented as, or include, any of a variety of different processor types each capable of executing program code. For example, PS 606 may be implemented as an individual processor, e.g., a single core capable of executing program code. In another example, PS 606 may be implemented as a multi-core processor. In still another example, PS 606 may include one or more cores, modules, co-processors, I/O interfaces, and/or other resources. PS 606 may be implemented using any of a variety of different types of architectures. Example architectures that may be used to implement PS 606 may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code.

NoC 608 is a programmable interconnecting network for sharing data between endpoint circuits in architecture 600. The endpoint circuits can be disposed in DPE array 602, PL 604, PS 606, and/or selected hardwired circuit blocks 612. NoC 608 can include high-speed data paths with dedicated switching. In an example, NoC 608 includes one or more horizontal paths, one or more vertical paths, or both horizontal and vertical path(s). The arrangement and number of regions shown in FIG. 6 is merely an example. NoC 608 is an example of the common infrastructure that is available within architecture 600 to connect selected components and/or subsystems.

Nets that are to be routed through NoC 608 may be unknown until a design is created for implementation within architecture 600. NoC 608 may be programmed by loading configuration data into internal configuration registers that define how elements within NoC 608 such as switches and interfaces are configured and operate to pass data from switch to switch and among the NoC interfaces to connect the endpoint circuits. NoC 608 is fabricated as part of architecture 600 (e.g., is hardwired) and, while not physically modifiable, may be programmed to establish logical connectivity between different master circuits and different slave circuits of a user circuit design. NoC 608, upon power-on, does not implement any data paths or routes therein. Once configured by a master circuit such as PMC 610, however, NoC 608 implements data paths or routes between endpoint circuits.

PMC 610 is responsible for managing architecture 600. PMC 610 is a subsystem within architecture 600 that is capable of managing the other programmable circuit resources across the entirety of architecture 600. PMC 610 is capable of maintaining a safe and secure environment, booting architecture 600, and managing architecture 600 during normal operations. For example, PMC 610 is capable of providing unified and programmable control over power-up, boot/configuration, security, power management, safety monitoring, debugging, and/or error handling for the different subsystems of architecture 600 (e.g., DPE array 602, PL 604, PS 606, and NoC 608). PMC 610 operates as a dedicated platform manager that decouples PS 606 from PL 604. As such, PS 606 PL 604 may be managed, configured, and/or powered on and/or off independently of one another.

Hardwired circuit blocks 612 are special-purpose circuit blocks fabricated as part of architecture 600. Though hardwired, hardwired circuit blocks 612 may be configured by loading configuration data into control registers to implement one or more different modes of operation. Examples of hardwired circuit blocks 612 may include input/output (I/O) blocks, transceivers for sending and receiving signals to circuits and/or systems external to architecture 600, memory controllers, or the like. Examples of different I/O blocks may include single-ended and pseudo differential I/Os. Examples of transceivers may include high-speed differentially clocked transceivers. Other examples of hardwired circuit blocks 612 include, but are not limited to, cryptographic engines, digital-to-analog converters (DACs), analog-to-digital converters (ADCs), and the like. In general, hardwired circuit blocks 612 are application-specific circuit blocks. In one aspect, one or more hardwired circuit blocks 612 may implement one or more PNL activation engines 100.

The various programmable circuit resources illustrated in FIG. 6 may be programmed initially as part of a boot process for architecture 600. During runtime, the programmable circuit resources may be reconfigured. In one aspect, PMC 610 is capable of initially configuring DPE array 602, PL 604, PS 606, and NoC 608. At any point during runtime, PMC 610 may reconfigure all or a portion of architecture 600. In some cases, PS 606 may configure and/or reconfigure PL 604 and/or NoC 608 once initially configured by PMC 610. As noted, those particular subsystems used to implement one or more PNL activation engines 100 may be reprogrammed as described herein without reconfiguring architecture 600 or the particular subsystem used to implement the one or more PNL activation engines 100.

Architecture 600 is provided as an example. Other example architectures for an IC in which one or more PNL activation engines 100 may be implemented may include only PL 604, only DP array 602, only HCBs 612, or any combination of the foregoing subsystems.

Figure 7:
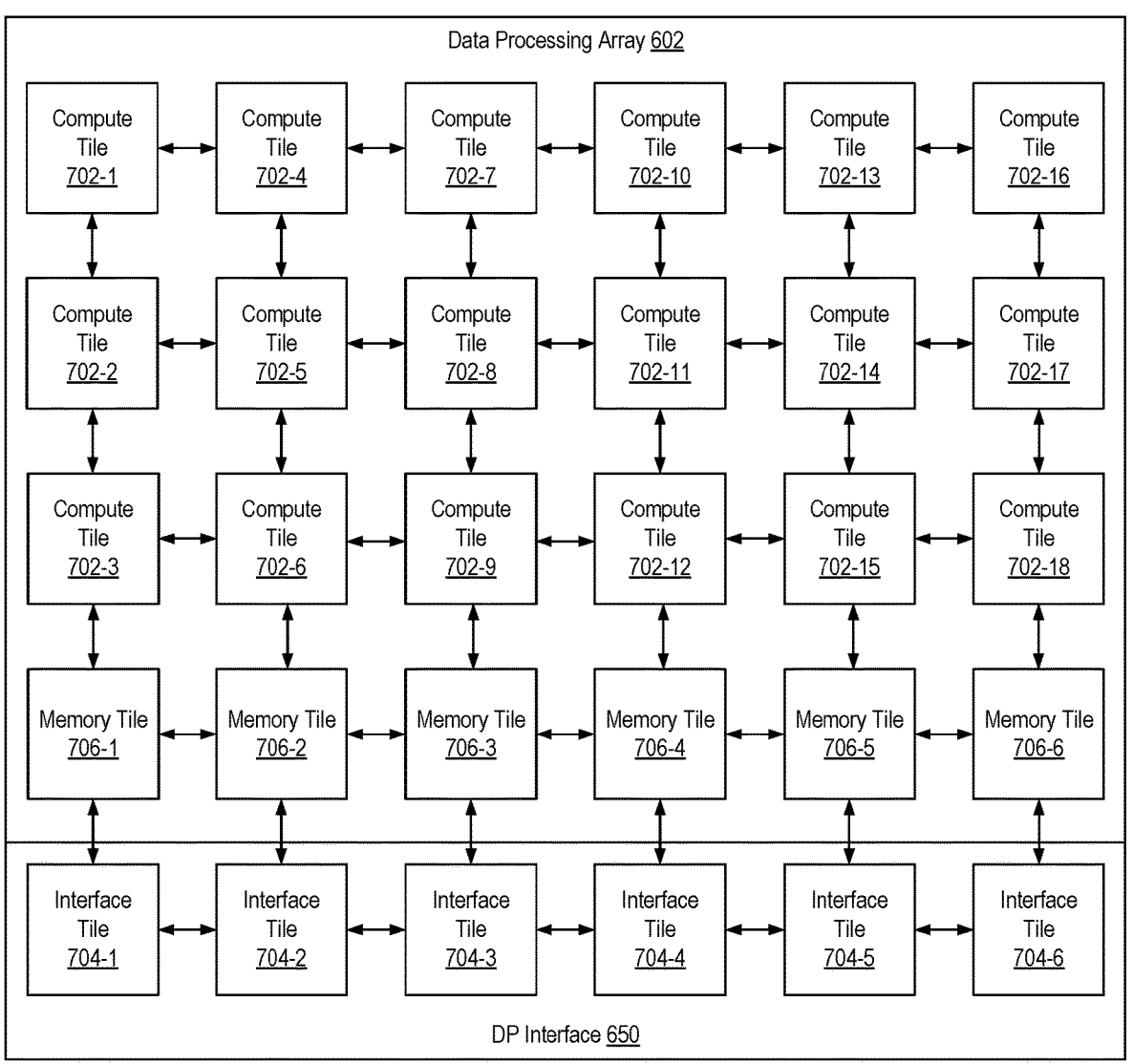
FIG. 7 illustrates an example implementation of a data processing array and a data processing interface.

FIG. 7 illustrates an example implementation of DP array 602 and DP interface 650. In the example, DP array 602 includes compute tiles 702 and memory tiles 706. In the example of FIG. 7, compute tiles 702 and memory tiles 706 are arranged in a grid having a plurality of rows and columns. Interface tiles 704 are arranged in a row where the individual interface tiles 704 are aligned with the columns of the grid arrangement of DP array 602. Compute tiles 702 include compute tiles 702-1, 702-2, 702-3, 702-4, 702-5, 702-6, 702-7, 702-8, 702-9, 702-10, 702-11, 702-12, 702-13, 702-14, 702-15, 702-16, 702-17, and 702-18. Interface tiles 704 include interface tiles 704-1, 704-2, 704-3, 704-4, 704-5, and 704-6. Memory tiles 706 include memory tiles 706-1, 706-2, 706-3, 706-4, 706-5, and 706-6.

Within this disclosure, the term "tile" as used in reference to DP array 602 and/or DP interface 650, refers to compute tiles 702, interface tiles 704, and/or to memory tiles 706. The term "array tile" means a compute tile 702 and/or a memory tile 706. The term "interface tile" means an interface tile 704. In the example, each tile is coupled to an adjacent tile to the left (west), right (east), above (north), and below (south) if a tile is located in such position(s).

The example of FIG. 7 is provided for purposes of illustration only. The number of tiles in a given column and/or row, the number of tiles included in DP array 602 and/or DP interface 650, the sequence or order of tile types (e.g., memory and compute tiles) in a column and/or row is for purposes of illustration and not limitation. Other arrangements may be included with varying numbers of tiles, rows, columns, mixtures of tile types, and the like. For example, rows of FIG. 7 are homogeneous in terms of tile type while columns are not. In other arrangements, rows may be heterogeneous in terms of tile type while columns are homogeneous. In some arrangements, additional rows of memory tiles 706 may be included in DP array 602. Such rows of memory tiles 706 may be grouped together without intervening rows of compute tiles 702 or distributed throughout DP array 602 such that rows of compute tiles 702 do intervene between rows or groups of rows of memory tiles 706.

In another example implementation of DP array 602, memory tiles 706 may be omitted such that the bottom row of compute tiles 702 couple directly to interface tiles 704.

Figure 8:
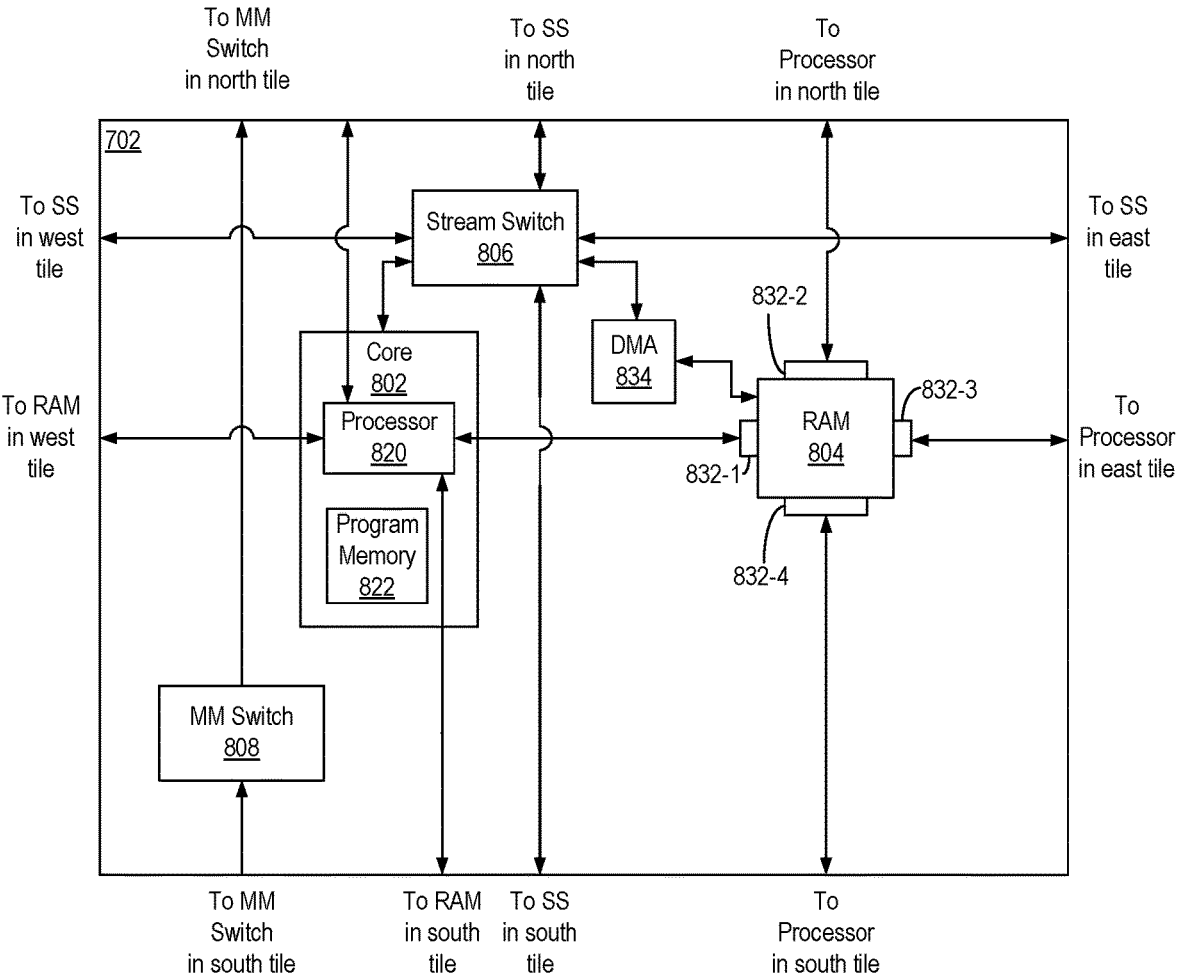
FIG. 8 illustrates an example implementation of a compute tile.

FIG. 8 illustrates an example implementation of a compute tile 702. The example of FIG. 8 is provided to illustrate certain architectural features of compute tiles 702 and not as a limitation of the form of DP array 602. Some connections between components and/or tiles are omitted for ease of illustration.

In the example, each compute tile 702 includes a core 802, a random-access memory (RAM) 804, a stream switch 806, and a memory map (MM) switch 808. Core 802 incudes a processor 820 and a program memory 822. Compute tile 702 further may include a set of control registers (not shown) that may be written by memory mapped switch 808 to control operation of the various components included in compute tile 702. Processor 820 may be any of a variety of different processor types. In one aspect, processor 820 is implemented as a vector processor. Program memory 822 may be loaded, e.g., by way of loading configuration data, with one or more sets of executable instructions called "kernels." Compute tiles 702 are capable of performing data processing operations and operating on a large amount of data through execution of the kernels.

Each core 802, e.g., processor 820, is directly connected to the RAM 804 located in the same compute tile 702 through a memory interface 832 (e.g., local memory interface 832-1). Within this disclosure, memory interface such as 832-1 are referred to as "local memory interfaces" since the memory interfaces are used by circuits in the same tile to access a RAM. By comparison, memory interfaces 832-2, 832-3, and 832-4 are referred to as "adjacent memory interfaces" as such memory interfaces are used by circuitry in another adjacent tile to access a RAM. As such, each processor 820 is capable of accessing RAM 804 in the same compute tile 702. Processor 820 is capable of executing program code stored in program memory 822. RAM 804 is configured to store application data (e.g., instruction decode table 108 and/or coefficients table 110). RAM 804 may be updated or written via MM switch 808 and/or stream switch 806. Though not illustrated, MM switch 808 may be coupled to any memory, including control registers, located in compute tile 702 so that such memory may be read or written. Each of RAMs 804 may include a direct memory access (DMA) circuit 834 that is capable of reading and writing data to the RAM 804 located in the same compute tile 702. The DMA circuit 834 may receive data via stream switch 806 and store such data in RAM 804 and/or output data read from RAM 804 over stream switch 806.

Each core 802, e.g., processor 820, may be directly connected to RAM 804 located in adjacent compute tiles 702 (e.g., in the north, south, east, and/or west directions). As such, processor 820 may directly access such other adjacent RAMs 804 in the same manner as processor 820 is able to access the RAM 804 located in the same compute tile 702 without initiating read or write transactions over stream switch 806 and/or without using a DMA circuit. As an illustrative example, processor 820 of compute tile 702-5 may read and/or write to the RAM 804 located in compute tiles 702-5, 702-2, 702-4, and 702-6 without submitting read or write transactions over stream switches 806. It should be appreciated, however, that a processor 820 may initiate read and write transactions to the RAM 804 of any other compute tile 702 and/or memory tile 706 via stream switches 806.

Processors 820 may also include direct connections, referred to as cascade connections (not shown), to processors 820 of adjacent cores (e.g., in the north, south, east, and/or west directions) that allow direct sharing of data stored in internal registers (e.g., an accumulation register) of processor 820 with other processors 820 without first writing such data to RAM 804 and/or conveying such data over stream switches 806.

Figure 9:
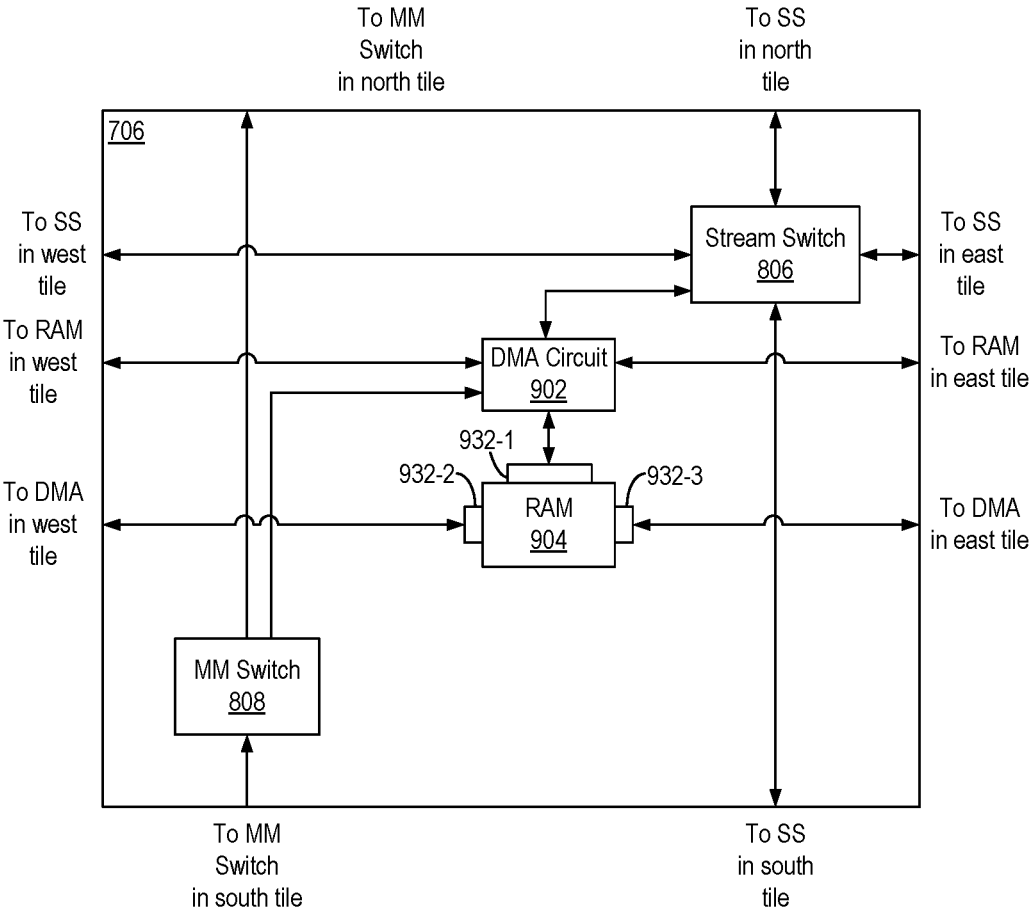
FIG. 9 illustrates an example implementation of a memory tile.

FIG. 9 illustrates an example implementation of a memory tile 706. The example of FIG. 9 is provided to illustrate certain architectural features of memory tiles 706 and not as a limitation of the form of DP array 602. Some connections between components and/or tiles are omitted for ease of illustration.

Each memory tile 706 includes a stream switch 806, a MM switch 808, a DMA circuit 902, and a RAM 904. Each memory tile 706 may also include control registers (not shown) that may be written by memory mapped switch 808 to control the operation of the various components illustrated in memory tile 706.

Each DMA circuit 902 of a memory tile 706 is coupled to the RAM 904 within the same memory tile 706 via a local memory interface 932-1 and may be coupled to one or more RAMs 904 of other adjacent memory tiles 706. In the example of FIG. 9, each DMA circuit 902 is capable of accessing (e.g., reading and/or writing) the RAM 904 included within the same memory tile 706 via local memory interface 932-1. RAM 904 includes adjacent memory interfaces 932-2 and 932-3 through which the DMA circuits of the east and west memory tiles 706 may access RAM 904. For example, the DMA circuit 902 of memory tile 706-2 may access the RAM 904 of memory tile 706-1 and/or the RAM 904 of memory tile 706-3. DMA circuit 902 may place data read from RAM 904 onto stream switch 806 and write data received via stream switch to RAM 904.

Figure 10A:
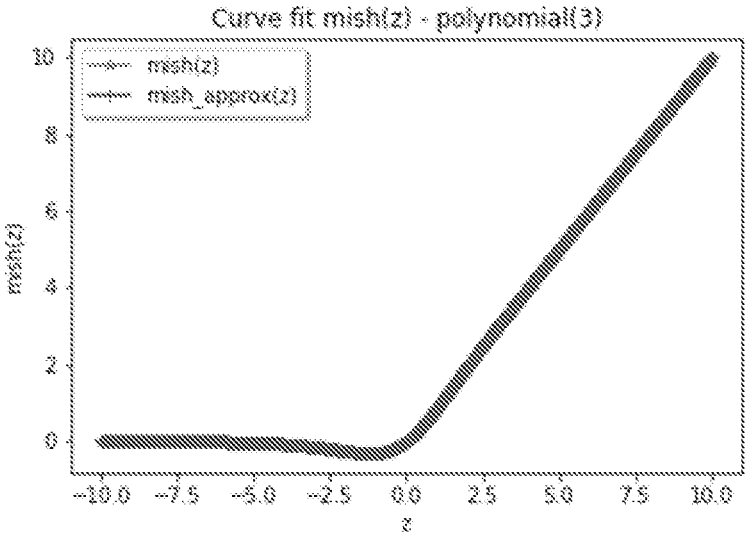
FIG. 10A illustrates an example of the curve fit that may be achieved using different sets of coefficients for different ranges of values of input data items as described herein to perform polynomial approximation of the Mish(x) non-linear activation function.
Figure 10B:
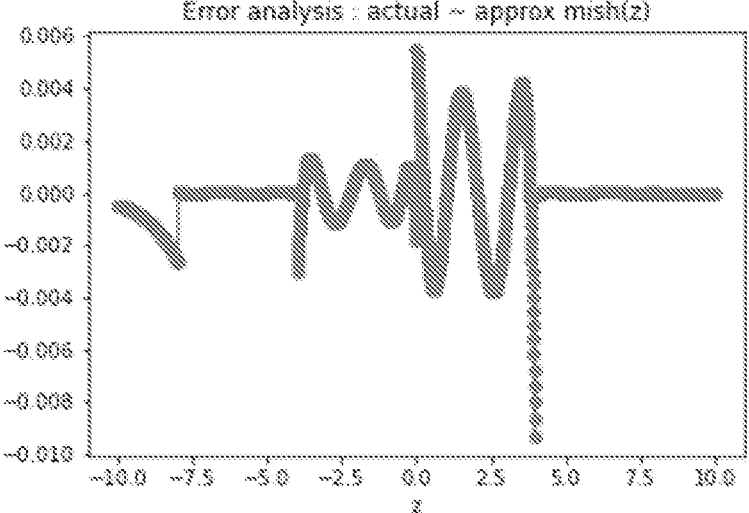
FIG. 10B illustrates an example of the error analysis of the curve fit of FIG. 10A.

FIG. 10A illustrates an example of the curve fit that may be achieved using different sets of coefficients for different ranges of values of input data items as described herein to perform polynomial approximation of the Mish(x) non-linear activation function. FIG. 10B illustrates an example of the error analysis of the curve fit of FIG. 10A.

Figure 11A:
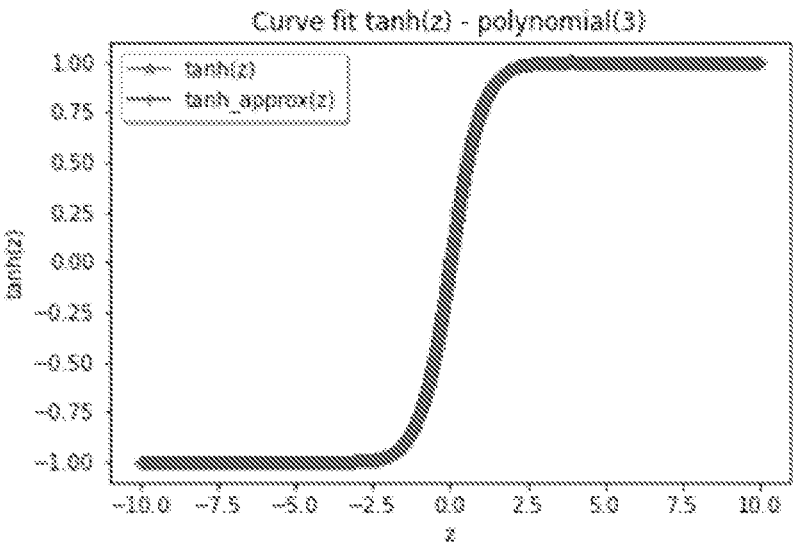
FIG. 11A illustrates an example of the curve fit that may be achieved using different sets of coefficients for different ranges of values of input data items as described herein to perform polynomial approximation of the Tanh(x) non-linear activation function.
Figure 11B:
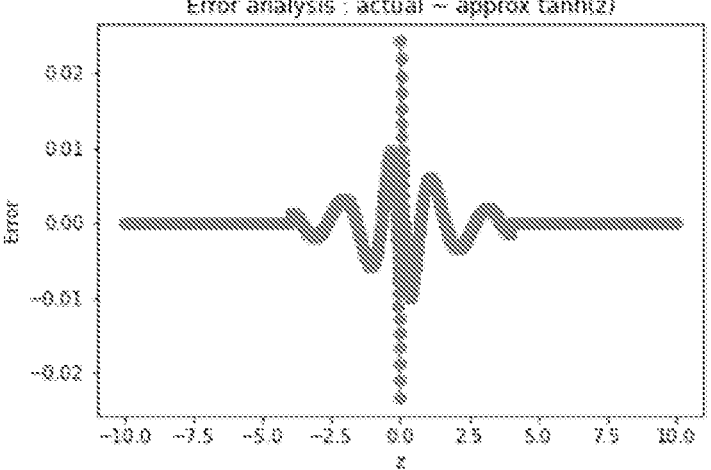
FIG. 11B illustrates an example of the error analysis of the curve fit of FIG. 11A.

FIG. 11A illustrates an example of the curve fit that may be achieved using different sets of coefficients for different ranges of values of input data items as described herein to perform polynomial approximation of the Tanh(x) non-linear activation function. FIG. 11B illustrates an example of the error analysis of the curve fit of FIG. 11A.

Figure 12A:
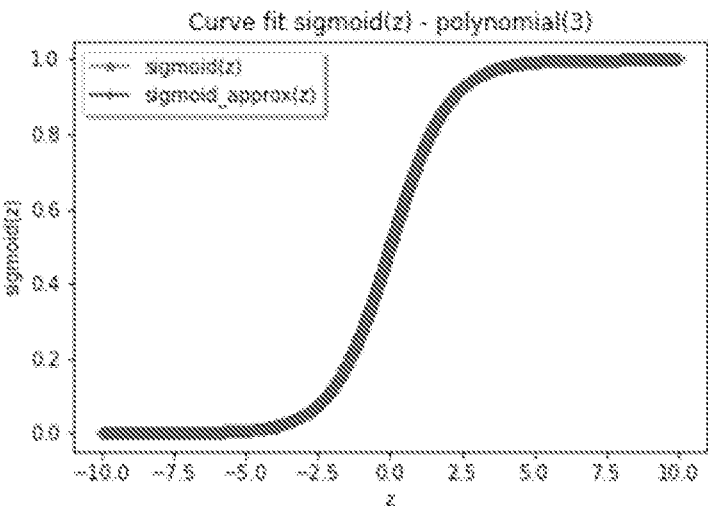
FIG. 12A illustrates an example of the curve fit that may be achieved using different sets of coefficients for different ranges of values of input data items as described herein to perform polynomial approximation of the Sigmoid(x) non-linear activation function.
Figure 12B:
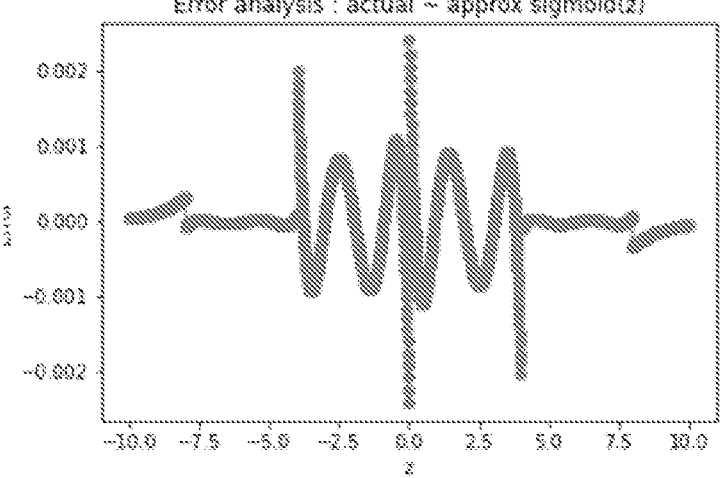
FIG. 12B illustrates an example of the error analysis of the curve fit of FIG. 12A.

FIG. 12A illustrates an example of the curve fit that may be achieved using different sets of coefficients for different ranges of values of input data items as described herein to perform polynomial approximation of the Sigmoid(x) non-linear activation function. FIG. 12B illustrates an example of the error analysis of the curve fit of FIG. 12A.

Figure 13A:
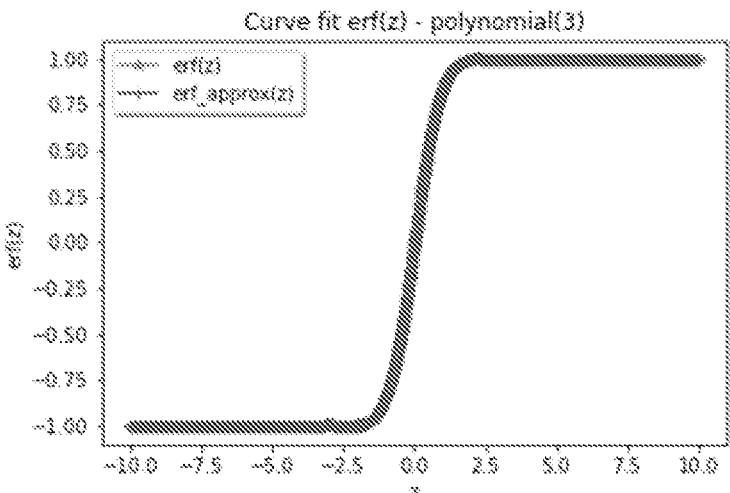
FIG. 13A illustrates an example of the curve fit that may be achieved using different sets of coefficients for different ranges of values of input data items as described herein to perform polynomial approximation of the Erf(x) non-linear activation function.
Figure 13B:
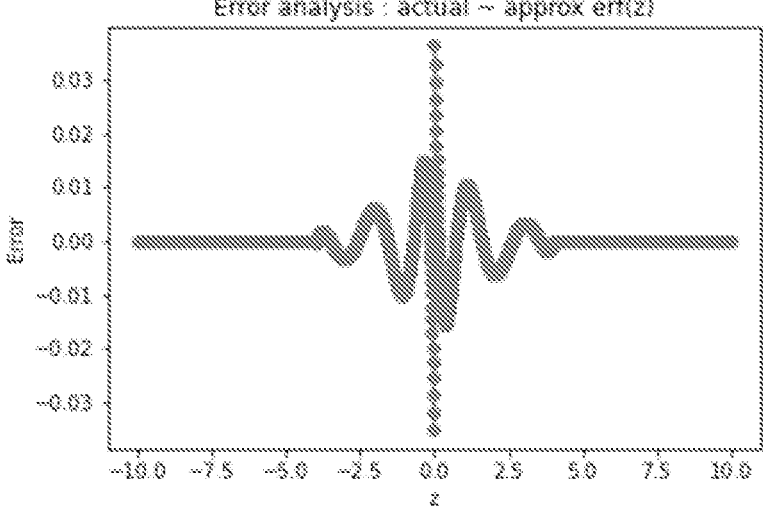
FIG. 13B illustrates an example of the error analysis of the curve fit of FIG. 13A.

FIG. 13A illustrates an example of the curve fit that may be achieved using different sets of coefficients for different ranges of values of input data items as described herein to perform polynomial approximation of the Erf(x) non-linear activation function. FIG. 13B illustrates an example of the error analysis of the curve fit of FIG. 13A.

FIG. 14 illustrates an example method 1400 of operation for a PNL activation engine 100 as described within this disclosure. In block 1402, input data may be received by the PNL activation engine 100. For example, one or more input data items may be received by one or more of the processing circuits 104 via the respective input ports 114. In block 1404, in response to receiving an instruction corresponding to the input data item, the PNL activation engine 100 is capable of selecting a first non-linear activation function from a plurality of non-linear activation functions by decoding the instruction. As discussed, the processing circuit programmer 102 is capable of receiving an instruction and decoding the instruction using the instruction decode table 108.

In block 1406, the PNL activation engine 100 is capable of fetching a first set of coefficients corresponding to the first non-linear activation function from a memory. For example, the processing circuit programmer 102 is capable of fetching the first set of coefficients using the instruction decode table 108 and the coefficients table 110. In block 1408, the PNL activation engine 100 is capable of performing (e.g., using one or more processing circuits 104) a polynomial approximation of the first non-linear activation function on the input data item using the first set of coefficients. In block 1410, the PNL activation engine 100 is capable of outputting a result from the polynomial approximation of the first non-linear activation function.

The foregoing and other implementations can each optionally include one or more of the following features, alone or in combination. Some example implementations include all the following features in combination.

In another aspect, for a subsequent input data received by the PNL activation engine 100, the PNL activation engine 100 is capable of selecting a second non-linear activation function from the plurality of non-linear activation functions. The second non-linear activation function is different from the first non-linear activation function. The PNL activation engine 100 is capable of fetching a set of coefficients corresponding to the second non-linear activation function from the memory. The PNL activation engine 100 is capable of performing a polynomial approximation of the second non-linear activation function on the subsequent input data using the second set of coefficients. The PNL activation engine 100 is capable of outputting a result from the polynomial approximation of the second non-linear activation function. As noted, the second set of coefficients may be programmed into the processing circuits 104 without having to reconfigure the device in which the PNL activation engine 100 is implemented. That is, the processing circuits 104, the instruction decode table 108, and/or the coefficients table 110 may be programmed and/or reprogrammed during runtime.

In another aspect, the PNL activation engine 100 is capable of implementing the polynomial approximations for different ones of the plurality of non-linear activation functions for different values of the input data during runtime by fetching different sets of coefficients from the memory for the different ones of the plurality of non-linear activation functions.

In another aspect, the PNL activation engine 100 is capable of performing at least one of pre-scaling the input data based on whether the polynomial approximation of the first non-linear activation function requires pre-scaling or post-scaling the result based on whether the polynomial approximation of the first non-linear activation function requires post-scaling.

In another aspect, the PNL activation engine 100 is capable of determining a selected range for the input data from a plurality of different ranges. Each range of the plurality of ranges may be associated with a different set of coefficients for the polynomial approximation of the first non-linear activation function. The PNL activation engine 100 is capable of using the set of coefficients associated with the selected range for the input data in performing the polynomial approximation of the selected non-linear activation function.

In another aspect, the selected range is specified as part of the received instruction.

In another aspect, the PNL activation engine 100 is capable of performing a comparison to determine the selected range of the input data.

In another aspect, at least one of the plurality of different ranges or the different sets of coefficients for the plurality of different ranges are programmable at runtime.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. The term "user" can refer to a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc., may be used herein to describe various elements. These elements should not be limited by these terms, as these terms are only used to distinguish one element from another unless stated otherwise or the context clearly indicates otherwise.

The flowchart and block diagrams in the Figures illustrate the architecture, functionality, and operation of possible implementations of systems and/or methods according to various aspects of the inventive arrangements. In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:

including a programmable non-linear (PNL) activation engine circuit within an integrated circuit implementing a neural network to implement a plurality of different activation function nodes of the neural network;

in response to receiving an electronic instruction, selecting, using a processing element configuration circuit of the PNL activation engine circuit, a selected non-linear activation function from a plurality of non-linear activation functions by decoding the electronic instruction;

at runtime of the PNL activation engine circuit, fetching, by the processing element configuration circuit, different subsets of coefficients corresponding to the selected non-linear activation function from a memory based on the electronic instruction as decoded, wherein the memory stores a table specifying coefficients for each of a plurality of different non-linear activation functions and a plurality of subsets of coefficients for the selected non-linear activation function, and wherein each subset of coefficients corresponds to a different range of input data to be processed at runtime;

programming one or more of a plurality of processing circuits of the PNL activation engine circuit with the different subsets of coefficients to process different ranges of input data at runtime;

performing, by the one or more of the plurality of processing circuits, polynomial approximations of the selected non-linear activation function on the different ranges of input data provided to the one or more of the plurality of processing circuits using the different subsets of coefficients; and outputting results from the polynomial approximations of the selected non-linear activation function from each of the one or more of the plurality of processing circuits to other circuits of the neural network in the integrated circuit.

2. The method of claim 1, further comprising:

for a subsequent input data received by the PNL activation engine circuit, selecting a different non-linear activation function from the plurality of non-linear activation functions;

fetching a set of coefficients corresponding to the different non-linear activation function from the memory;

performing a polynomial approximation of the different non-linear activation function on the subsequent input data using the set of coefficients corresponding to the different activation function; and outputting a result from the polynomial approximation of the different non-linear activation function.

3. The method of claim 1, wherein the PNL activation engine circuit implements polynomial approximations for different ones of the plurality of non-linear activation functions for different input data during runtime by fetching different sets of coefficients from the memory for the different ones of the plurality of non-linear activation functions.

4. The method of claim 1, further comprising:

performing at least one of, pre-scaling the input data based on whether the polynomial approximation of the selected non-linear activation function requires pre-scaling; or post-scaling a result based on whether the polynomial approximation of the selected non-linear activation function requires post-scaling.

5. The method of claim 1, wherein different ones of the plurality of processing circuits are configured to process different ranges of input data, and wherein each different one of the plurality of processing circuits is provided with a particular subset of coefficients corresponding to the range of input data handled by the processing circuit.

6. The method of claim 1, wherein each of the plurality of processing circuits is configured to compute a result of the selected activation function for each subset of coefficients for each range of input data, compute the range of the input data, and select the result of the selected activation function corresponding to the range of the input data.

7. The method of claim 1, wherein the electronic instruction specifies a range of each item of input data provided to each of the plurality of processing circuits and each processing circuit is provided with a particular subset of coefficients for the range of the item of input data provided to that processing circuit based on the electronic instruction.

8. The method of claim 1, wherein different subsets of coefficients for the plurality of different ranges are programmable at runtime.

9. A system, comprising:

a plurality of processing circuits;

a coefficients table stored in a memory, wherein the coefficients table stores different subsets of coefficients for each non-linear activation function of a plurality of non-linear activation functions, wherein each subset of coefficients for a non-linear activation function corresponds to a different range of input data items to be processed at runtime;

an instruction decode table stored in the memory, wherein the instruction decode table stores a pointer to each of the plurality of non-linear activation functions in the coefficients table; and a processing element configuration circuit configured to decode a received electronic instruction to select a selected non-linear activation function from the plurality of non-linear activation functions using the instruction decode table, fetch different subsets of coefficients for the selected non-linear activation function from the coefficients table, and provide the different subsets of coefficients fetched to one or more of the plurality of processing circuits;

wherein the one or more processing circuits compute a result using a polynomial approximation of the selected non-linear activation function for one or more input data items using the subset of coefficients fetched from the coefficients table for the input data items corresponding to the different ranges of input data.

10. The system of claim 9, wherein, for the selected non-linear activation function, the one or more processing circuit are configured to perform at least one of pre-scaling the one or more input data items or post-scaling the result based on whether the polynomial approximation of the selected non-linear activation function requires pre-scaling or post-scaling, respectively.

11. The system of claim 9, wherein:

for a subsequent input data item received, the processing element configuration circuit selects a different non-linear activation function from the plurality of non-linear activation functions based on a further electronic instruction and fetches a set of coefficients corresponding to the different non-linear activation function from the memory; and one or more of the plurality of processing circuits performs a polynomial approximation of the different non-linear activation function on the subsequent input data using the set of coefficients corresponding to the different activation function and outputs one or more results from the polynomial approximation of the different non-linear activation function.

12. The system of claim 9, wherein different ones of the plurality of processing circuits are configured to process different ranges of input data items and wherein each different one of the plurality of processing circuits is provided with a particular subset of coefficients corresponding to the range of input data item handled by the processing circuit.

13. The system of claim 9, wherein each of the plurality of processing circuits is configured to compute a result of the selected activation function for each subset of the coefficients for each range of a selected data input item, compute the range of the selected data input item, and select the result of the selected activation function corresponding to the range of the selected data input item.

14. The system of claim 9, wherein the electronic instruction specifies a range of each input data item provided to each of the plurality of processing circuits and each processing circuit is provided with a particular subset of coefficients for the range of the input data item provided to that processing circuit based on the electronic instruction.

* * * * *